United States Patent [19]

O'Connor et al.

[11] 4,372,658
[45] Feb. 8, 1983

[54] PIPELINE INSPECTION APPARATUS

[75] Inventors: Donald T. O'Connor, Barrington Hills; Donald E. Lorenzi, Des Plaines; John J. Flaherty, Elk Grove Village; Edward Schaefer, Bellwood, all of Ill.

[73] Assignee: Magnaflux Corporation, Chicago, Ill.

[21] Appl. No.: 347,541

[22] Filed: Feb. 10, 1982

Related U.S. Application Data

[63] Continuation of Ser. No. 155,512, Jun. 2, 1980, abandoned, which is a continuation-in-part of Ser. No. 881,148, Feb. 27, 1978, Pat. No. 4,249,810.

[51] Int. Cl.³ .............................................. G03B 37/00
[52] U.S. Cl. ...................................... 354/63; 346/33 P
[58] Field of Search .......... 346/33 P, 33 WL, 107 W; 354/63

[56] References Cited

U.S. PATENT DOCUMENTS

| | | | |
|---|---|---|---|
| 1,684,337 | 9/1928 | Wright | 346/107 W |
| 2,737,864 | 3/1956 | Gutterman et al. | 354/63 |
| 2,892,150 | 6/1959 | Nettles et al. | |
| 2,932,243 | 4/1960 | Woronoff | 354/63 |
| 2,951,362 | 9/1960 | En Dean et al. | 346/33 P |
| 2,980,854 | 4/1961 | En Dean et al. | 346/33 P |
| 3,064,127 | 11/1962 | Green et al. | 346/33 P |
| 3,162,505 | 12/1964 | Hall | 346/33 P |
| 3,244,085 | 4/1966 | Pulfer | 354/63 |
| 3,496,457 | 2/1970 | Proctor et al. | 346/33 P |
| 3,667,359 | 6/1972 | Watts et al. | |

FOREIGN PATENT DOCUMENTS

| | | | |
|---|---|---|---|
| 45-17840 | 6/1970 | Japan | 354/63 |
| 751694 | 7/1956 | United Kingdom | 354/63 |
| 397638 | 1/1974 | U.S.S.R. | 354/63 |

Primary Examiner—Monroe H. Hayes
Attorney, Agent, or Firm—Neuman, Williams, Anderson & Olson

[57] ABSTRACT

Pipeline inspection apparatus is provided including a camera unit and associated illumination means, preferably a strobe flash unit, for recording on photographic film the rectangular images corresponding to generally rectangular internal surface portions of a pipe for detection of defects, a viewing axis of the camera being normal to the axis of the pipe. Weight means are provided for operating in a manner such as to establish a viewing axis in predetermined angular relation to a vertical plane through the axis of a horizontal pipe. In one embodiment, the device is supported by resilient cups for movement through the pipe and the entire device is rotatable under the influence of the weight means. In another embodiment, at least the optical portion of the camera unit is rotatably supported and connected to the weight means. Magnetic flaw detection means are provided for triggering the camera unit.

6 Claims, 9 Drawing Figures

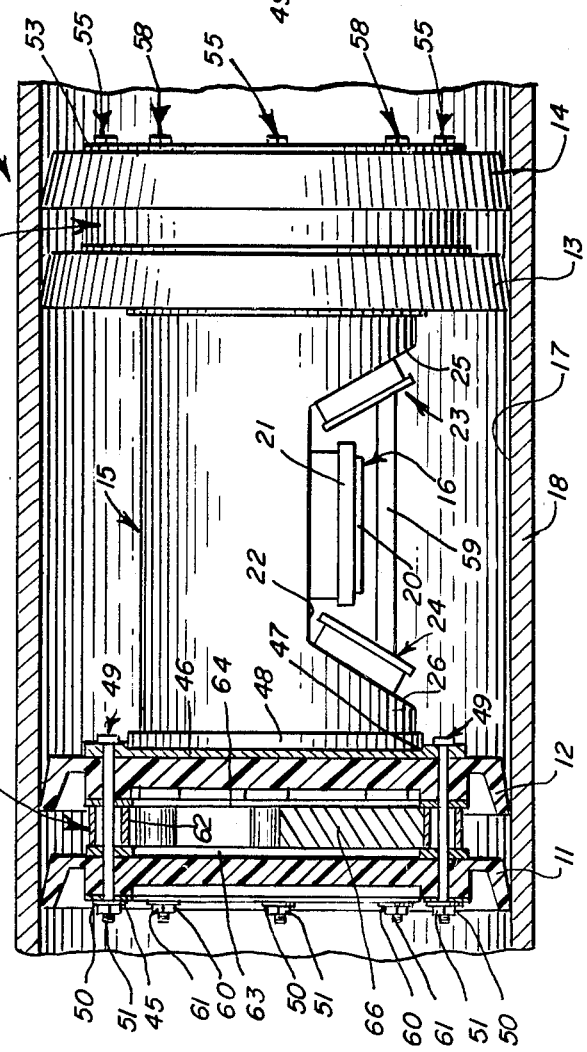
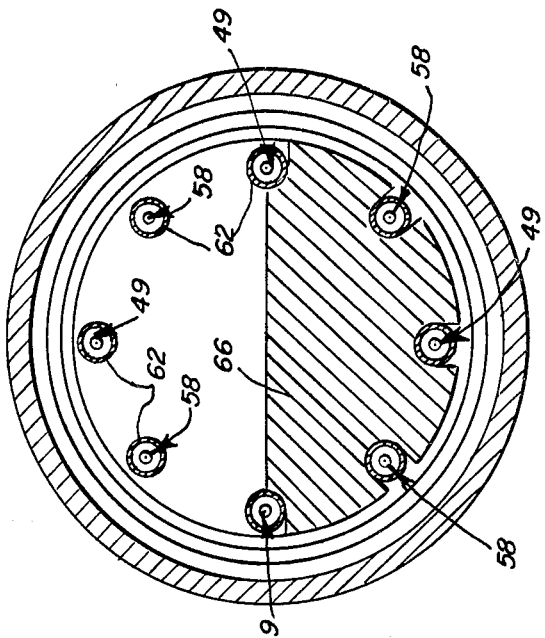
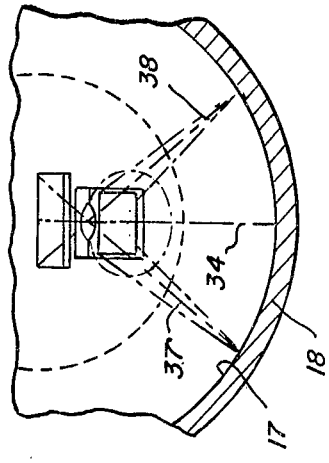
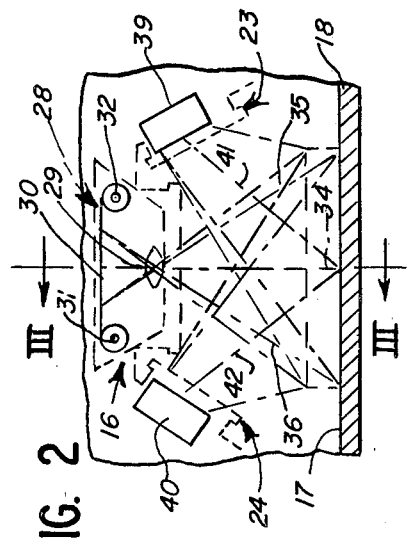

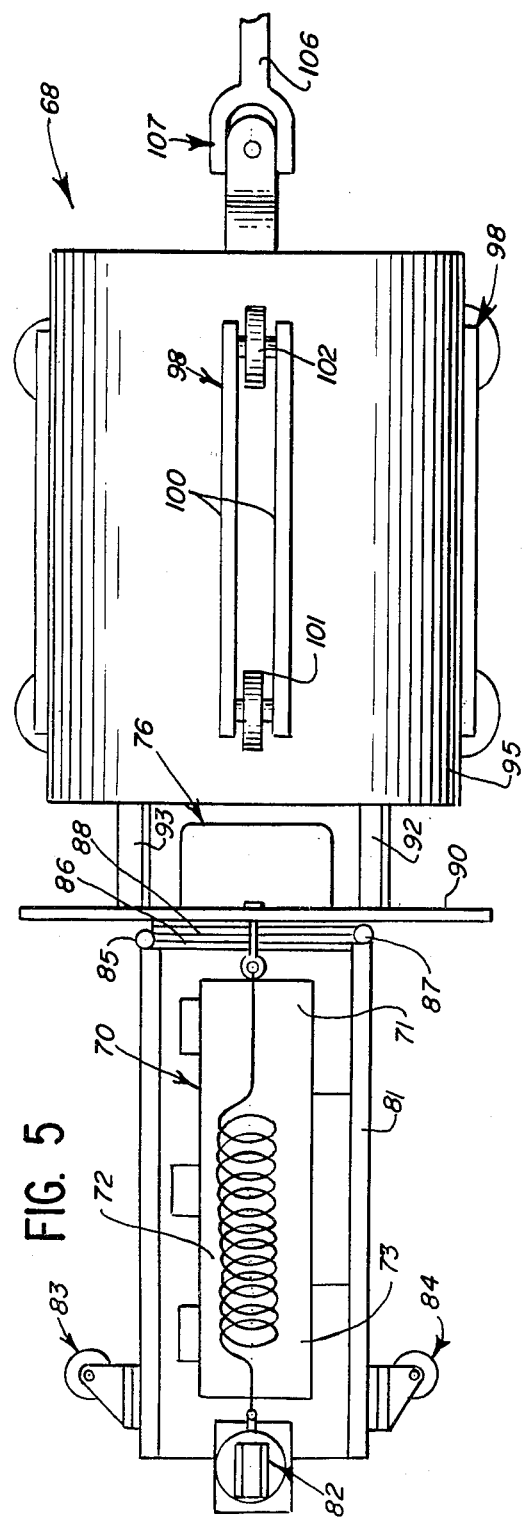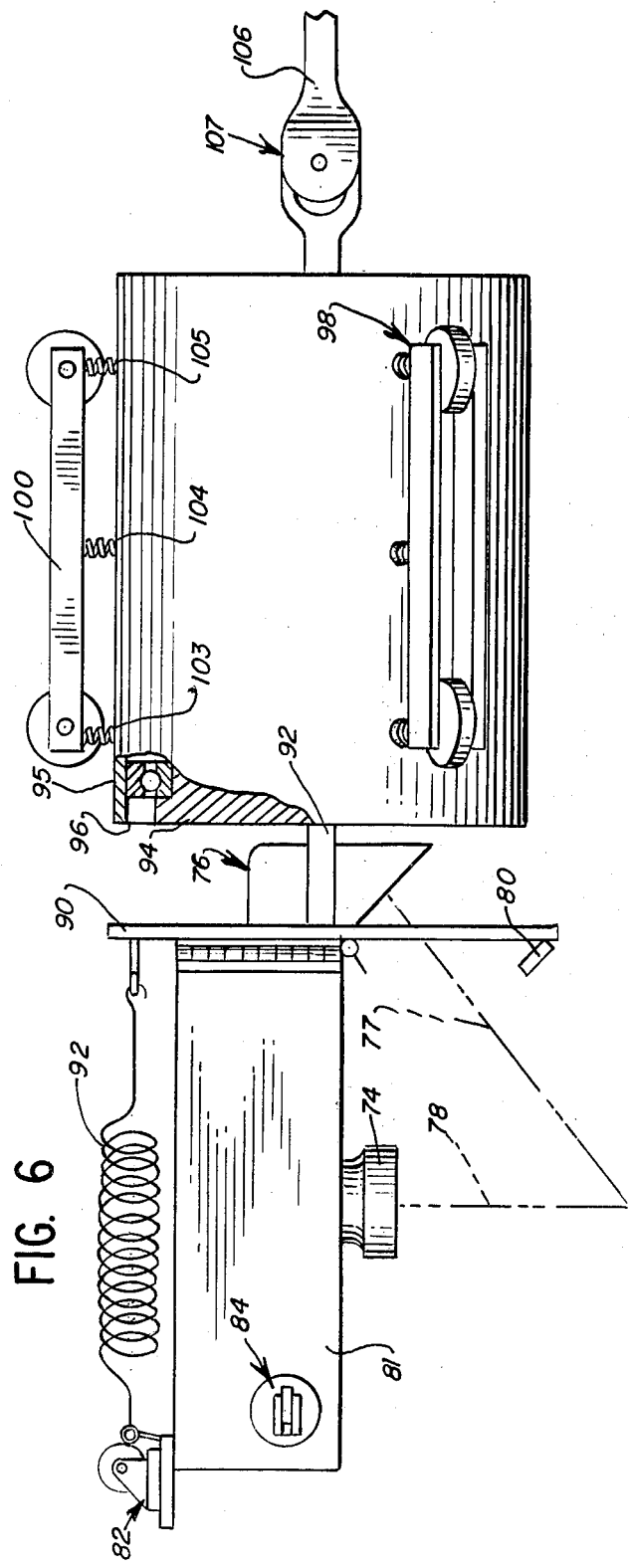

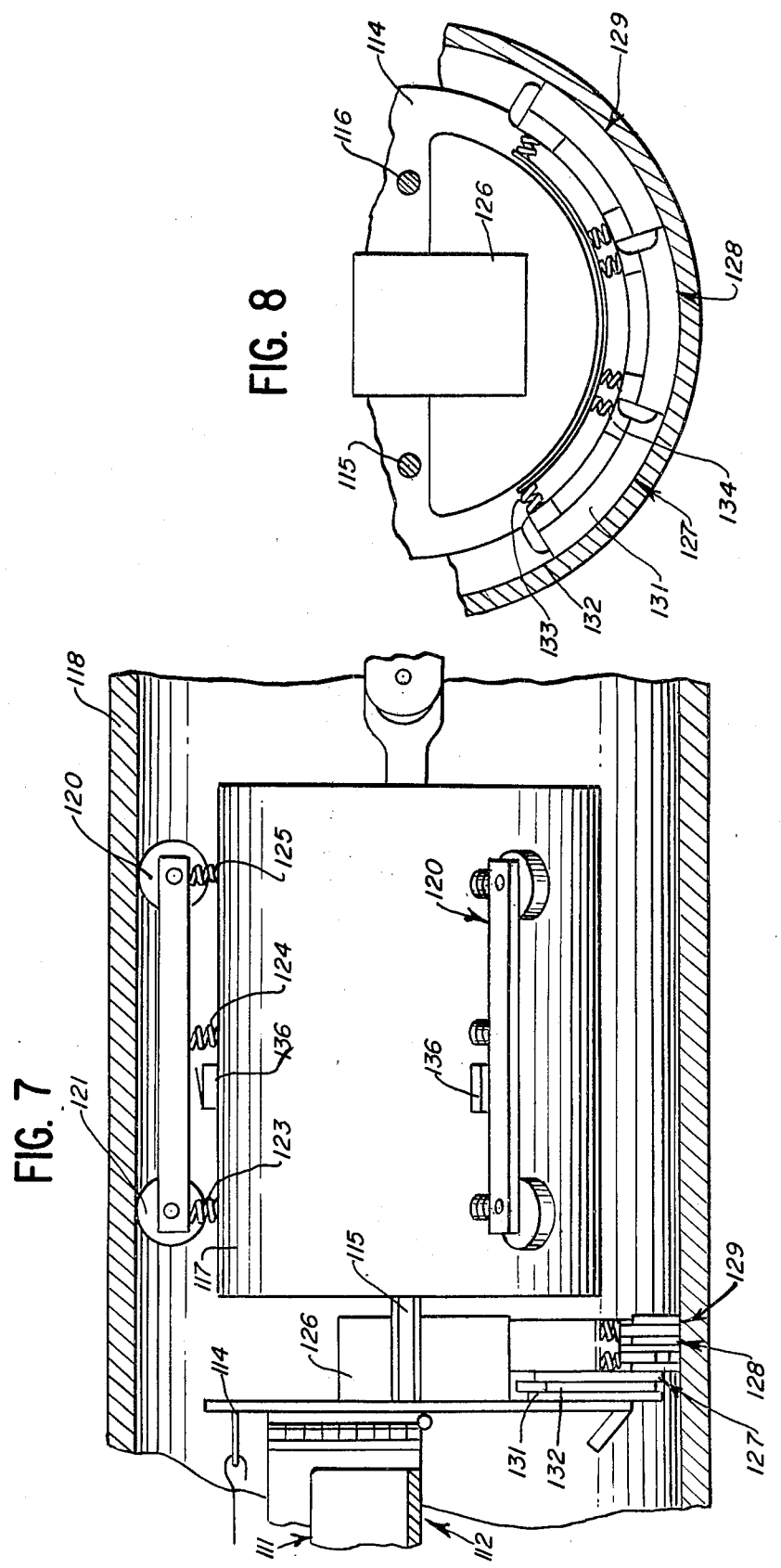

PIPELINE INSPECTION APPARATUS

This application is a continuation of application Ser. No. 155,512 filed June 2, 1980, now abandoned, which was a continuation-in-part of application Ser. No. 881,148, filed Feb. 27, 1978, now U.S. Pat. No. 4,249,810.

This invention relates to pipeline inspection apparatus and more particularly to apparatus movable within a pipe for detecting potentially damaging and dangerous flaws in the pipe with a high degree of effectiveness and reliability. The apparatus produces a photographic record which can be accurately interpreted and which facilitates repair of the pipe and, at the same time, the apparatus is relatively simple and easy to operate.

BACKGROUND OF THE PRIOR ART

Various techniques have heretofore been proposed for pipe inspection, including magnetic inspection by leakage field and/or eddy current techniques, gamma or X-ray techniques, ultrasonic techniques, television techniques and photographic techniques. Each of such techniques may be used to advantage in certain applications. However, each technique, as heretofore employed, has serious limitations in other applications, such as, for example, in the inspection of pipeline used for transport of natural gas from offshore stations. Natural gas cannot be safely treated offshore and in a raw state it may include the combination of carbon dioxide and free water which produces carbonic acid and causes corrosion of steel, especially when the temperature is relatively high as is often the case. The corrosion is augmented by an erosion effect where the rate of flow is high and at bends and over weld beads or the like where the flow is turbulent.

If localized damage to the pipe could be detected before it presents a serious problem, it would be possible to effect repair or to otherwise take corrective measures. For example, it is possible to move devices known as "pigs" through a pipe and by moving a series of such pigs through a pipe, it can be cleaned, etched, washed, dehydrated and then coated with a protective coating such as an epoxy. Such a procedure is, of course, relatively expensive especially in that the pipeline cannot be used for an extended period of time, and it is not desirable to utilize the procedure unless and until the necessity therefor can be established by a suitable inspection. Also, even after a protective coating is applied, there is the possibility of breaks in the coating and further periodic inspection is desirable to make certain that the coating is properly protecting the pipe. Accordingly, a reliable and accurate way of inspecting such pipeline for defects would be highly desirable.

As above indicated, prior art techniques are not satisfactory. Magnetic inspection, if properly performed, has many advantages including a high degree of sensitivity to flaws of types which may cause problems and the ability to cover large distances with suitable magnetic recording or other information storage equipment. However, there are disadvantages including the necessity of having operators with a high degree of skill in order to obtain an accurate interpretation of the information obtained. Ultrasonic techniques have a serious disadvantage in that it is difficult to couple the ultrasonic energy into the wall of a pipe and television techniques have a serious disadvantage, at least in the present state of development, in that a high sensitivity and high resolution is difficult to obtain especially if a substantial length of pipe is to be inspected and the information is to be recorded. If the information is to be transmitted through a cable, there is a problem as to loss of sensitivity at great distances and the difficulty in moving a cable having a large mass through a pipeline. Photographic techniques as heretofore proposed have had limitations not recognized in the prior art particularly with respect to obtaining records which can be easily and accurately interpreted and also with respect to reliability.

With regard to specific prior art disclosures, the Nettles et al. U.S. Pat. No. 2,892,150 discloses a device movable through a pipe and including seal or cup members for sealing engagement with the inside of the pipe to permit drive of the device by fluid pressure. A magnetic testing device is provided for detecting variations in the thickness of the wall of the pipe and indications obtained are recorded on a recording tape. To correlate the recorded indications with the position of the device while permitting variations in speed, the recording tape is driven from a wheel engaged with the inside surface of the pipe.

The Green et al. U.S. Pat. No. 3,064,127 discloses a pipeline survey instrument in which a survey capsule or "pig" carries cups or sealing flanges engageable with the inside of a pipe so that the capsule may be moved through the pipe by fluid pressure. The capsule carries various instruments for making tests including a radiation analysis assembly for detecting cavities in the pipe wall, a caliper assembly for measuring the inside diameter of the pipe, a water detector and an electric current sensing assembly. In addition, a recording assembly is provided for recording the results of the various measurements. Since the pig may move at various speeds, the recording assembly is driven from a wheel engaged with the inside of the pipe and the measurements are thereby correlated with the distance along the pipe regardless of the speed of movement of the pig.

No camera is carried by the pig of the Green et al. patent. However, the use of a camera for the internal inspection of pipe has been proposed in other prior art references. For example, the Pulfer U.S. Pat. No. 3,244,085 discloses a capsule movable along the inside of a pipe or tube and including a camera and illumination means. Film exposures are taken at spaced locations along the length of the pipe or tube, the direction of each exposure being controlled by a shutter or by control of the duration of the operation of the illumination means. Another similar disclosure is contained in the Watts et al. U.S. Pat. No. 3,667,359 in which the camera and illumination means are supported by a pig which carries cups or sealing flanges engageable with the inside of the pipe so as to be movable by fluid pressure, as in the Green et al. patent. The Watts et al. assembly also includes a wheel engageable with the inside of the pipe and connected to the camera so as to correlate the pictures with the distance along the pipe.

In both the Pulfer and the Watts et al. devices, the pictures are taken from one end of the capsule or pig, the viewing axis of the camera being coincident with the axis of the pipe and the illumination means being positioned radially outside the axis of the camera.

The Watts et al. U.S. Pat. No. 3,667,359 also discloses an arrangement for directing a gas spray across the surface of a lens assembly for preventing fogging thereof.

SUMMARY OF THE INVENTION

This invention was evolved with the general object of overcoming the disadvantages of prior art pipeline inspection systems and of providing apparatus which can move within a pipeline and which will detect potentially dangerous flaws with a high degree of reliability and effectiveness and which produces records which can be easily and accurately interpreted.

Important facets of the invention relate to the recognition of problems with arrangements such as proposed in the prior art. One problem relates to the production of photographic records which can be accurately interpreted in a manner such that standards can be established for determining whether a pipe is satisfactory or whether steps should be taken to repair the pipe or otherwise take a corrective measure.

In accordance with this invention, an orientation of the viewing axis is used which has been found to produce highly advantageous results. In the aforementioned prior application, two viewing axis orientations are disclosed. In the first, the viewing axis is transverse to the axis of the pipe and a generally rectangular image is produced which corresponds to a generally rectangular surface area of the pipe with length and width dimensions, respectively, corresponding to the axial length and arcuate width dimensions of the internal surface area of the pipe. In the second viewing axis orientation as disclosed in the aforementioned prior application, the viewing axis is generally coincident with the axis of the pipe and the resultant image, to the extent that it is useful, is of generally annular form.

It is found that the first orientation, in which the viewing axis is normal to the axis of the pipe, is highly advantageous in that the relationship between the size of defects and the size of the corresponding portions of the images produced on the developed film is substantially uniform. This is particularly true when the illumination means projects a beam toward the internal surface area of the pipe at a generally uniform acute angle to the axis of the pipe. Thus, the dimensions of shadows produced are generally uniformly proportional to the size of recesses in the internal surface area of the pipe. It is found that such relationships cannot be readily obtained with the second orientation in which the viewing axis is substantially coincident with the pipe axis. It is also difficult to obtain uniform illumination such that the size of recorded indications bear a readily determinable relationship to the sizes of the actual recesses in the surface of the pipe. For these reasons, the first orientation is highly advantageous and is much to be preferred over the second orientation.

Further problems which have not been recognized and dealt with relate to those which arise when extremely long lengths of pipe must be inspected. When many miles of pipe are to be inspected, it is not possible to carry enough film and to otherwise make it possible to photograph all portions of the pipe. In order to make the most effective use of time, equipment, and materials, it is found to be highly desirable to restrict the pictures to only those portions of the pipe in which defects are most likely to occur. One portion of the pipe of primary interest is the lower part of the pipe in which water may collect to combine with carbon dioxide and cause corrosion. To restrict the taking of the pictures to the lower portion of the pipe, the camera support is rotatable relative to the axis of the pipe, so that it may be weighted to be positioned at a predetermined angular position and thus the camera may be positioned so that the viewing axis is directed straight downwardly or at any desired angular position relative to the pipe. In our aforementioned prior application, a support is provided including wheels engaged with the inside of the pipe, and the camera support is journalled through suitable bearings. In another arrangement as disclosed in this application, an entire pig is so weighted as to assume a predetermined angular position, the camera support being adjustably positionable at a certain angular position relative to the weighted pig.

It is also desirable to record images where there are magnetic discontinuities, and as disclosed in our aforementioned prior application, magnetic leakage field detector units are provided for use in detecting magnetic discontinuities, such being usable to trigger the operation of the camera.

In accordance with a specific feature of the invention, circuitry including a delay circuit is provided for responding to signals produced from the magnetic leakage field detector units to activate the camera and illumination means in a manner such that a picture is produced of the area producing such signals.

In addition to producing pictures where there are magnetic discontinuities including pipe welds, pictures may be taken at predetermined positions along the pipe sufficient in number to insure a high degree likelihood of detecting any problems which might exist while conserving on the amount of film used.

Additional features of the invention relate to construction of the apparatus in a manner such that it is very rugged and reliable and capable of being moved through long lengths of pipeline without damage to the camera and other instrumentation carried by the apparatus and while also avoiding any damage to the pipeline.

This invention contemplates other objects, features and advantages which will become more fully apparent from the following description taken in conjunction with the accompanying drawings.

BRIEF DESCRIPTION OF THE DRAWINGS

FIG. 1 is a side elevational view, partly in section, illustrating pipe inspection apparatus constructed in accordance with the invention;

FIG. 2 illustrates diagrammatically in side elevation the positioning of camera and strobe light units of the apparatus in relation to the pipe;

FIG. 3 is another diagrammatic view looking from a position as indicated by line III—III of FIG. 2;

FIG. 4 is a sectional view taken substantially along line IV—IV of FIG. 1;

FIG. 5 is a top plan view of another form of apparatus constructed in accordance with the invention;

FIG. 6 is a side elevational view of the apparatus of FIG. 5;

FIG. 7 is a side elevational view of another form of apparatus according to the invention;

FIG. 8 is a sectional view taken substantially along line VIII—VIII of FIG. 7.

DESCRIPTION OF PREFERRED EMBODIMENTS

Figure 9:
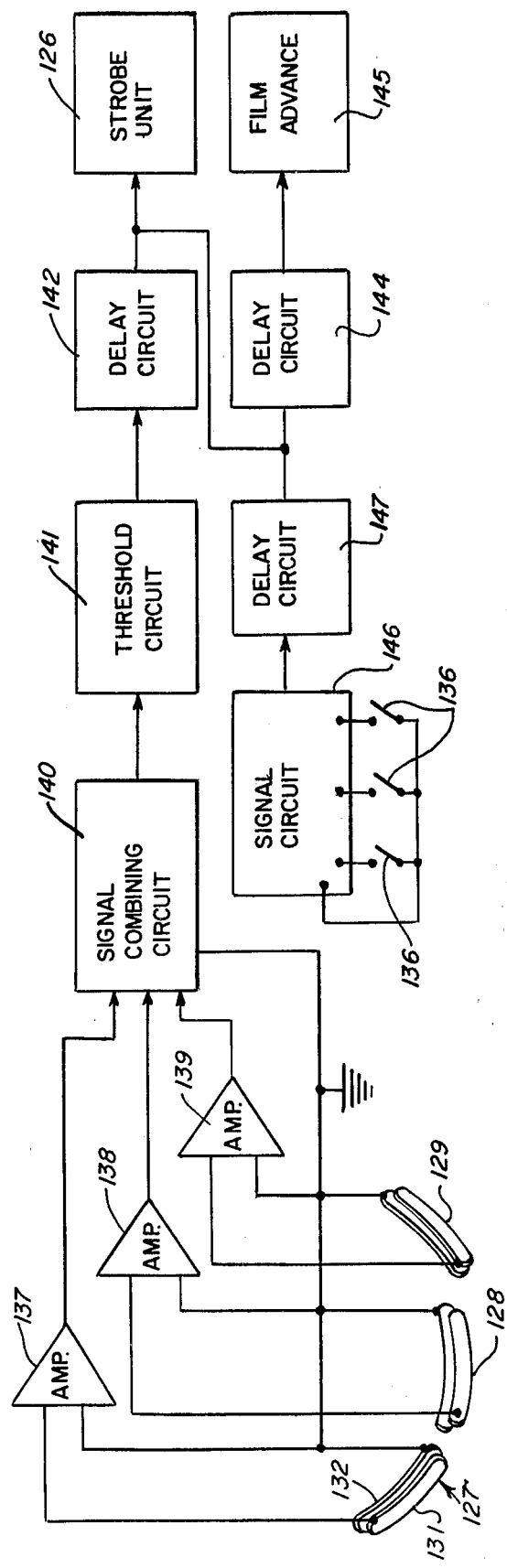
FIG. 9 is a schematic electrical diagram for the apparatus of FIGS. 7 and 8.

Reference numeral 10 generally designates a pipe inspection apparatus constructed in accordance with the principles of this invention. The illustrated apparatus 10 is in the form of a "pig" device similar to those used for cleaning, washing and coating pipes and it includes two rearward cups 11 and 12 and two forward cups 13 and 14 which are respectively disposed behind and in front of a central housing section 15 in which a camera assembly 16 is supported. The cups 11–14 are of a resilient elastomeric material and define flanges for resilient sealing engagement with the inside surface 17 of a pipe 18, permitting the apparatus to be driven by the pressure of gas pumped through the pipe 18 or by the pressure of compressed air or the like pumped into the pipe 18. The pipe 18 may, for example, be used to carry raw natural gas from an off-shore location to an on-shore processing station and the apparatus 10 is designed to produce high resolution photographs which will reveal erosion and corrosion at pipe bends, pitting at circumferential welds and heat-affected areas and corrosion such as caused by puddles at low pipe line areas.

The camera assembly 16 includes a lens disposed above a protective glass plate 20 held by a support 21 on a horizontal wall portion 22 of the section 15. To illuminate the surface of the pipe, a pair of strobe lights are provided behind a pair of ports 23 and 24 which are disposed on inclined wall portions 25 and 26 of the central housing section 17, the ports 23 and 24 having glass windows for transmission of light therethrough.

As diagrammatically shown in FIGS. 2 and 3, the camera assembly 18 includes a camera 28 having a lens 29 which projects an image to a film plane at which a film 30 is moved from a supply reel 31 to a take-up reel 32, suitable electrically operated drive means being provided for driving the take-up reel 32 to advance the film 30 for taking each picture. With this arrangement, and with the viewing axis of the camera, indicated by broken line 34, being normal to the axis of the pipe, a generally rectangular image is projected to an image area of the film 30 which corresponds to a generally rectangular internal surface area of the pipe. The image has length and width dimensions which respectively correspond to the axial length and arcuate width dimensions of the internal surface area. Thus, as indicated diagrammatically by lines 35 and 36 in FIG. 2, the forward and rearward limits of the rectangular image area on the film may correspond to rearward and forward limits of a generally rectangular surface area of the internal surface 17 of the pipe 18. As indicated by lines 37 and 38 in FIG. 3, the side limits of the rectangular image area of the film 30 may correspond to arcuately spaced limits of a generally rectangular surface area of the internal surface 17 of the pipe 18.

As also shown diagrammatically in FIG. 2, strobe lights 39 and 40 are mounted behind the ports 23 and 24 to project beams of light along axes as indicated by broken lines 41 and 42. Each strobe light is spaced axially from the viewing axis and each projects a beam of light toward the internal surface area of the pipe which is to be photographed, along an illumination direction at an acute angle to the axis of the pipe.

The arrangement with the viewing axis of the camera at right angles to the axis of the pipe, thereby producing a generally rectangular image corresponding to a generally rectangular internal surface area of the pipe, is highly advantageous in that the relationship between the size of defects and the size of the corresponding indication on the film is substantially uniform. As a result, standards can be established for determining whether a pipe can be passed as being satisfactory or whether remedial action should be taken to repair or service the pipe. The necessity for requiring an inspector of the film to exercise critical judgment is minimized.

The illumination of the surface area of the pipe as disclosed is also advantageous for similar reasons, it being noted that the relationship between the direction of the light and the surface of the pipe is substantially uniform throughout the entire internal surface area of the pipe which corresponds to the image produced.

Since the internal surface area of the pipe which is photographed is of limited angular extent, it is important that the portion photographed be selectable and identifiable. It is also found to be important that the pictures be taken in an angular direction which has the greatest likelihood of producing indications of any critical defects which may exist. In inspecting horizontal runs of pipelines such as used for conveying raw natural gas, it is found that the lower portion of the internal surface of the pipe is generally of primary interest because liquids can accumulate to cause corrosion of the pipe under certain conditions. In accordance with the invention, the apparatus 10 is weighted in a manner such that the viewing axis 34 of the camera may be in a vertical plane through the axis of the device or at any desired angle relative to such a vertical plane.

In FIG. 1, a rearward cup assembly including the rearward cups 11 and 12 and associated elements is shown in section. As illustrated, a spacer structure 44 is sandwiched between the cups 11 and 12 and a holding ring 45 is disposed against the rear side of the rear cup 11 while a plate 46 is disposed against the forward face of the cup 12. The forward face of the plate 46 is recessed to receive the rearward end of the central housing section 15, a radially inwardly facing annular shoulder 47 being provided which engages a rear end of an annular flange portion 48 of the central housing section 15. Four bolts 49 are provided having head portions engaging the plate 46 and having shank portions extending through the cup 12, spacer structure 44, cup 11, plate 45 and washers 50 with nuts 51 being threaded on the rearward terminal ends of the shank portions of the bolts 49.

The forward cup assembly which includes cups 13 and 14 is similar to the rearward cup assembly and includes a spacer structure 52 similar to the spacer structure 44, a ring 53 similar to the ring 45 and four bolts 55.

To hold the rearward and forward cup assemblies against the rearward and forward ends of the central housing section, four elongated bolts 58 are provided which have shank portions extending through the forward cup assembly, thence through sleeves 59 positioned between the rearward end of the forward cup assembly and the plate 46 at the forward end of the rearward cup assembly, thence through the rearward cup assembly and through washers 60 with nuts 61 being threaded on the rearward terminal ends of the elongated bolts 58.

The spacer structure 44 is formed from a pair of rings 63 and 64 and a plurality of spacer sleeves 62 through which the shank portions of the connecting bolts 49 and 58 extend. To weight the apparatus so as to cause it to assume a predetermined angular position, a weight member 66 of semi-cylindrical shape is located between the rings 63 and 64. The weight member 66 is of a heavy material, preferably lead, and a similar weight member is preferably included in the forward cup assembly.

For most applications, the viewing axis of the camera is preferably at a six o'clock position so as to be in a vertical plane through the axis of the apparatus and so as to produce photographs of the bottom of the pipe where corrosion may be produced as the result of the accumulation of liquid, particularly in low pipeline areas. However, the viewing axis may be positioned at any desired angular position. To adjust the viewing axis of the camera, the nuts 61 may be loosened and the central housing section 15 may then be rotated to the desired angular position relative to the weights of the cup assemblies after which the nuts 61 may be tightened to securely lock the housing section 15 in the desired angular position.

The illustrated apparatus may be propelled by the pressure of a gaseous medium in the pipeline, either the natural gas or other product normally carried by the pipeline or compressed air or the like introduced into the pipeline. The illustrated apparatus may thus be self-propelled or it may, in the alternative, be propelled by a towing pig in which case cups of the apparatus may be provided with openings or grooves for passage of the gaseous medium past the apparatus of the towing pig. The apparatus could also, of course, be propelled by other means such as by a motor-driven drive unit as disclosed in our prior copending application Ser. No. 88,148.

In the apparatus 10 of FIGS. 1-4, the entire apparatus is rotated to a predetermined angular position whereby the force of gravity acts on the weights which are positioned to place the center of gravity of apparatus to the offset of the angular position. It is also possible to support the camera for rotation by the pipe axis to a predetermined angular position while supporting the camera from support means non-rotatably engaged with the inside surface of the pipe. Referring to FIGS. 5 and 6, reference numeral 68 generally designates an apparatus in which the camera is supported for rotation about the pipe axis from the support structure non-rotatably engaged with the pipe, the apparatus 68 being as disclosed in our aforementioned prior copending application Ser. No. 88,148.

The apparatus 68 is in the form of a camera unit and it includes a camera 70 which includes electrically operated film storage and transport means whereby photographic film is moved from a supply reel within one end portion 71 of a housing 72 to a take-up reel within an opposite end portion 73 of the housing 72. The camera 70 further includes a lens assembly 74 which operates to project an image of the inside surface of the pipe onto a section of the film positioned at an image area intermediate the supply and take-up reels.

To illuminate the inside surface of the pipe, an electrically operated strobe flash unit 76 is provided arranged to project a beam of light along an axis 77 which intersects the central axis of the lens 74, indicated by reference numeral 78, at a point on the inside surface of the pipe.

The orientation of the illumination and lens axes 77 and 78 are of substantial importance. Preferably, the lens axis is generally normal to the inside surface of the pipe, i.e., at substantially a right angle to the pipe axis and the illumination axis is at an acute angle, preferably on the order of 45 degrees or less. Corrosion pits or the like cast shadows such that from inspection of a developed picture, an accurate estimate can be made with respect to the depth of a pit or the like and as to whether it necessiates a repair operation on the pipe.

A counter 80 is energized from pulses generated in response to movement of the apparatus within the pipe and registers the distance traveled, being disposed within the field of view of the lens 74 so as to record the position in each film frame.

The camera 70 is secured to a frame 81 which carries caster wheel assemblies 82, 83 and 84 at one end thereof. At the opposite end thereof, the camera support frame 51 is hingedly connected through a hinge pin 85 to a plate 86 which is hingedly connected through a pin 87 to a second plate 88 which, in turn, is connected through a third pin 89 to a support plate 90, the axes of the pins 85 and 87 being in spaced parallel relation and the axis of the pin 89 being at right angles to the axes of the pins 85 and 87. A coiled tension spring 91 is secured between an outer end of the camera support frame 81 and the support plate 90 to normally hold the end of the camera frame 81 and the plates 86, 88 and 90 against one another as shown. In moving through turns or bends in the pipe, the camera frame 81 may, if necessary, pivot relative to plate 86 about the axis of pin 85 or the camera frame and the plate 86 may together pivot relative to the plate 88 and the axis of the pin 87 or the camera frame 81 and plates 86 and 88 may pivot relative to the plate 90 about the axis of the pin 89.

The support plate 90 carries the strobe unit 76 and the counter 80 and is supported through a pair of posts 92 and 93 from a frame 94 which is journalled within a cylindrical housing 95 for movement about the axis of the cylindrical housing 95, preferably with one ball-bearing assembly 96 being provided at one end of the housing 95 and another similar assembly being provided at the other end. Suitable slip rings are provided within the cylindrical shell or housing 95 for transmission of electrical control signals to the camera 70, strobe unit 76 and counter 80.

To support the housing 95 for movement within the pipe, it carries three wheel assemblies 98 spaced equi-angularly, 120 degrees from each other, each including a frame 100 extending longitudinally in generally parallel relation to the axis of the housing 95 and carrying a pair of wheels 101 and 102 at the opposite ends thereof, the frame 100 being supported from the housing 95 through compression springs 103, 104 and 105, operative to urge the wheels 101 and 102 into engagement with the inside surface of the pipe.

The apparatus 68 may be propelled by means of a motor-driven drive unit as disclosed in our prior copending application or it may be propelled by a suitable towing pig. For such purposes, a bar 106 is connected through a U-joint 107 to one end of the housing 95.

FIG. 7 shows a modified form of apparatus which is in the form of a camera unit 110 similar to the camera unit 68 of FIGS. 5 and 6 and having a camera 111 on a frame 112 which is supported through a hinge assembly from a support plate 114 which is supported through posts 115 and 116 from a frame journalled in a housing 117. Housing 117 is supported for movement within a pipe 118 through three wheel assemblies 119, each including a frame 120 which carries wheels 121 and 122 and which is connected to the housing 117 through compression springs 123, 124 and 125. A flash unit 126, corresponding to flash unit 76, is mounted on the support plate 114.

Magnetic detection means are provided for sensing inhomogeneities in the pipe. In the illustrated arrangement, three units 127, 128 and 129 are provided, each of which extends arcuately, the three units being offset axially and being in overlapping relation to cover an arcuate distance corresponding to the arcuate dimension of the effective field of view of the camera. The units 127–129 may have the same construction and may be resiliently supported in substantially the same way. Unit 127 may, for example, include an arcuate core 131 of permanently magnetized material and of generally U-shaped cross-sectional form with a coil 132 wound thereon. When the unit moves over a corrosion pit or other discontinuity in pipe 118, the magnetic linkage field of the permanent magnet core 131 changes, inducing a corresponding electrical signal in the coil 132. Core 131 is supported from the support plate through springs 133 and 134 for resiliently yieldable contact with the inside of pipe 118.

The camera unit 110 also incorporates means for sensing changes in the internal dimensions or configuration of the pipe such as caused by indentations, bend or obstructions. Such means include three switch units 136, each associated with the frame 120 of one of the wheel assemblies 119 to be actuated when the frame is moved radially inwardly a predetermined extent.

FIG. 9 is a schematic diagram of the electrical connection of units of the camera unit 110 of FIGS. 7 and 8. The magnetic leakage field detector units 127–129 are connected through amplifiers 137–139 and through circuitry 140 to a threshold detector 141 which develops an output signal in response to a leakage field signal having an amplitude greater than a predetermined amplitude.

The output signal so developed is applied to a delay circuit 142 which after a certain delay, proportional to the speed of travel of the apparatus, applies a signal to the strobe unit 126 of the camera unit 110 so as to take a picture of the portion of the pipe which produced the signal developed by the magnetic detection circuit. The signal applied to the strobe is also applied through a delay circuit 144 to a film advance control 145 of the camera of the unit 110.

The switch units 136 are connected through circuitry 146 to another delay circuit 147 which after a certain delay, proportional to the speed of travel of the apparatus, applies a signal to the strobe unit 126 and also to the delay circuit 144. It is noted that the direction of movement of the unit 110 is assumed to be to the right as viewed in FIG. 7 so that the dimensional and magnetic detector means is ahead of the camera unit.

The arrangement of FIGS. 7, 8 and 9 is particularly advantageous in inspection of long pipeline runs, in which it is desirable to avoid unnecessary consumption of film and to restrict the picture-taking to those sections of the pipe which are of possible interest as indicated by dimensional changes or the presence of magnetic discontinuities.

It may be noted that the camera in any case may be rotated about the axis of the pipe to various positions and/or suitable split mirrors or other optical elements may be used to effect taking of the picture of the entire internal surface of the pipe. In most applications, however, the taking of pictures may be restricted to the lower part of the inside surface of the pipe, where corrosion is apt to occur because of the accumulation of liquid, and the apparatus of FIGS. 1–4 is advantageous in this respect.

The apparatus of FIGS. 1–4 is also advantageous in that the camera and the strobe lights are supported in well-protected positions behind glass windows of the ports in the central housing section 15. It is further noted that with the central housing section being disposed between the forward and rearward cup assemblies, a protected region is provided for the taking of the pictures. The arrangement thus serves to minimize problems with interference due to puddles of liquid in the pipe, splashing of liquids and liquid droplets or vapors in the air or gas in the pipe. Where there are severe problems, liquid and atmosphere control means may be used which are a separate invention forming the subject matter of a separate application to be filed. It is also noted that a wiper assembly may be used in conjunction with the optical ports, also forming a separate invention which is the subject matter of another separate application to be filed.

The arrangement of FIGS. 1–4 is also advantageous in that weld-sensing means may be employed, mounted on the central housing section, such weld-sensing means being a separate invention which forms the subject matter of still another application to be filed.

It will be understood that modifications and variations may be effected without departing from the spirit and scope of the novel concepts of this invention.

What is claimed is:

1. In pipe inspection apparatus, a device arranged to be moved down through a vertically extending pipe section and thence into a horizontal pipe section for longitudinal horizontal movement therewithin, said device comprising photographic camera means including means defining a rectangular image area, film storage and transport means arranged for feeding film through said image area and optical means for projecting an image to said image area, said optical means being arranged to project said image along a viewing axis from an internal surface area of the pipe with said viewing axis being normal to the axis of said pipe and with a generally rectangular image being produced in said image area which corresponds to a generally rectangular internal surface area of the pipe and which has length and width dimensions respectively corresponding to the axial length and arcuate width dimensions of said internal surface area, illumination means for illuminating said internal surface area of the pipe, operating means for operating said film storage and transport means and said illumination means during movement of said device along the pipe for recording on the film a plurality of images corresponding to axially spaced generally rectangular surface areas of the pipe, said illumination means being spaced axially from said viewing axis and being arranged to project light toward said internal surface area of the pipe in a direction at a substantially uniform acute angle to the axis of the pipe and with substantially uniform intensity, the relationship between the direction of the light and the surface of the pipe being substantially uniform throughout all of said internal surface area of the pipe such that shadows are produced across recesses in said internal surface area of the pipe and such that there is a substantially uniform relationship between the size of the images of said shadows and the size of the corresponding recesses in said internal surface area, engagement means including at least two axially spaced cup members defining resilient annular flanges in engagement with axially spaced portions of the inside surface of the pipe, a central housing section supporting said camera and illumination means therewithin, a pair of cup member support structures secured to opposite ends of said central housing section for support of said central housing section from said cup members, said viewing axis being approximately midway between said cup member support structures, and weight means operative under the force of gravity to urge said device toward a certain angular position when moving longitudinally through a horizontal pipe section and to place said viewing axis at a predetermined angular position relative to the pipe.

2. In pipe inspection apparatus as defined in claim 1, said central housing section having ports including windows of solid transparent material for protecting said camera means and said optical means thereof and for protecting said illumination means.

3. In apparatus as defined in claim 1, magnetic detection means carried by said device for developing electrical signals in response to inhomogeneities in the pipe, and means responsive to said electrical signals for controlling said camera and illumination means for recording on the film images of internal surface areas having magnetically detected inhomogeneities therein.

4. In pipe inspection apparatus as defined in claim 3, said magnetic detection means being forwardly spaced from said camera and illumination means in the direction of movement of said device, and said control means including circuit means for delaying the time of operation of said camera and illumination means in proportion to the speed of movement of said device.

5. In pipe inspection apparatus as defined in claim 1, said viewing axis being placed at a six o'clock position so that said plurality of images correspond to lower rectangular surface areas of the inside of the pipe.

6. In pipe inspection apparatus as defined in claim 5, the resilient annular flange of one of said cup members positioned forwardly in relation to said viewing axis being operative to clear accumulated liquids from the lower surface of the pipe to facilitate obtaining of a clear image thereof.

* * * * *